United States Patent [19]
Kitagawa et al.

[11] Patent Number: 4,573,041
[45] Date of Patent: Feb. 25, 1986

[54] ELECTRIC WIRING SYSTEM HAVING A PLURALITY OF SENSORS

[75] Inventors: Junji Kitagawa; Sigeyuki Akita; Kouichi Yamanoue, all of Okazaki, Japan

[73] Assignee: Nippon Soken, Inc., Nishio, Japan

[21] Appl. No.: 587,656

[22] Filed: Mar. 8, 1984

[30] Foreign Application Priority Data

Mar. 9, 1983 [JP] Japan .................................. 58-38711

[51] Int. Cl.[4] .......................... G08B 1/08; H04Q 7/00

[52] U.S. Cl. .................................... 340/538; 340/505; 340/531; 340/534; 340/310 A

[58] Field of Search ............... 340/538, 531, 534, 505, 340/506, 508, 518, 509, 825.06, 310 R, 825.1, 310 A, 825.07, 825.54

[56] References Cited

U.S. PATENT DOCUMENTS

| | | | |
|---|---|---|---|
| 3,516,063 | 6/1970 | Arkin et al. | 340/505 |
| 3,713,142 | 1/1973 | Getchell | 340/505 |
| 3,735,396 | 5/1973 | Getchell | 340/505 |
| 3,815,093 | 6/1974 | Caretto et al. | 340/505 |

*Primary Examiner*—Donnie L. Crosland
*Attorney, Agent, or Firm*—Cushman, Darby & Cushman

[57] ABSTRACT

An electric wiring system has a plurality of terminal units, a plurality of sensors connected to the terminal units by signal input lines, and a central control unit connected to the terminal units by a pair of common power supply lines, which receive signals from the sensors. The central control unit has a reference signal generator circuit which repetitively generates a reference signal composed of a train of pulses, a predetermined number of which are assigned to each of the sensors, a modulator circuit for applying the reference signal to the power supply lines, a demodulator circuit for picking up a composite signal generated by the terminal unit from the power supply line, and a control circuit for detecting abnormal and normal signals of the sensors and breakage of the power supply lines and signal input lines based on the presence and absence of high-frequency pulses in the composite signal, thus indicating sensor and line conditions. Each of the terminal units has a demodulator circuit for picking up the reference signal from the power supply lines, a composite signal generator circuit for generating the composite signal by adding the high-frequency pulses at pulse positions corresponding to the pulses of the reference signal assigned to the sensors, dependent on the abnormal and normal signals of the sensors and breakage of the signal input lines, and a modulator circuit for applying the composite signal to the power supply lines.

13 Claims, 4 Drawing Figures

ELECTRIC WIRING SYSTEM HAVING A PLURALITY OF SENSORS

BACKGROUND OF THE INVENTION

The present invention relates to an electric wiring system, and more particularly to an electric wiring system with centralized supervisory capability for monitoring abnormal signals from sensors for engine oil, coolant water, etc., in a vehicle or the like.

Vehicle incorporate various sensors located in different positions. As electronics utilized in vehicles has progressed in recent years, the trend is that the kinds and number of such sensors are increasing. The conditions of the sensors and subjected to centralized supervision in the vehicle compartment. A conventional arrangement is that each of the sensors is directly connected to a control unit having a monitor indicator, and is disadvantageous in that as the number of sensors used is increased, the number of wires is also increased, resulting in an greater number of steps of installing the wires and a larger wiring harness size.

SUMMARY OF THE INVENTION

It is an object of the present invention to provide an electric wiring system having a greatly reduced number of signal delivery wires between a central control unit and a plurality of sensors.

Another object of the present invention is to provide an electric wiring system for employing a plurality of pulses superposed in common power supply lines to carry information from each sensor.

The above and other objects, features and advantages of the present invention will become more apparent from the following description when taken in conjunction with the accompanying drawings in which a preferred embodiment of the present invention is shown by way of illustrative example.

An electric wiring system according to the present invention comprises at least one terminal unit, a plurality of sensors connected to the terminal units by signal input lines, and a central control unit connected to the terminal units by a pair of common power supply lines for receiving signals from the sensors. The central control unit is composed of a reference signal generator circuit, a modulator circuit, a demodulator circuit, and a control circuit, and the terminal unit is composed of a demodulator circuit, a composite signal generator circuit, and a modulator circuit. The reference signal generator circuit repetitively generates a reference signal composed of a train of pulses, a predetermined number of which is assigned to each of the sensors. The reference signal is then applied to the power supply lines by the modulator circuit in the central control unit. The reference signal is then picked up from the power supply lines by the demodulator in the terminal unit. The composite signal generator circuit generates a composite signal in which high-frequency pulses dependent on output conditions of the sensors are added at pulse positions corresponding to the pulses of the reference signal assigned to the sensors. The composite signals is applied to the power supply lines by the modulator circuit in the terminal unit and delivered back to the central control unit. The composite signal is then picked up from the power supply lines by the demodulator circuit in the central control unit. The control circuit in the central control unit operates an output device dependent on the presence and absence of the high-frequency pulses in the composite signal.

DESCRIPTION OF THE PREFERRED EMBODIMENT

Figure 1:
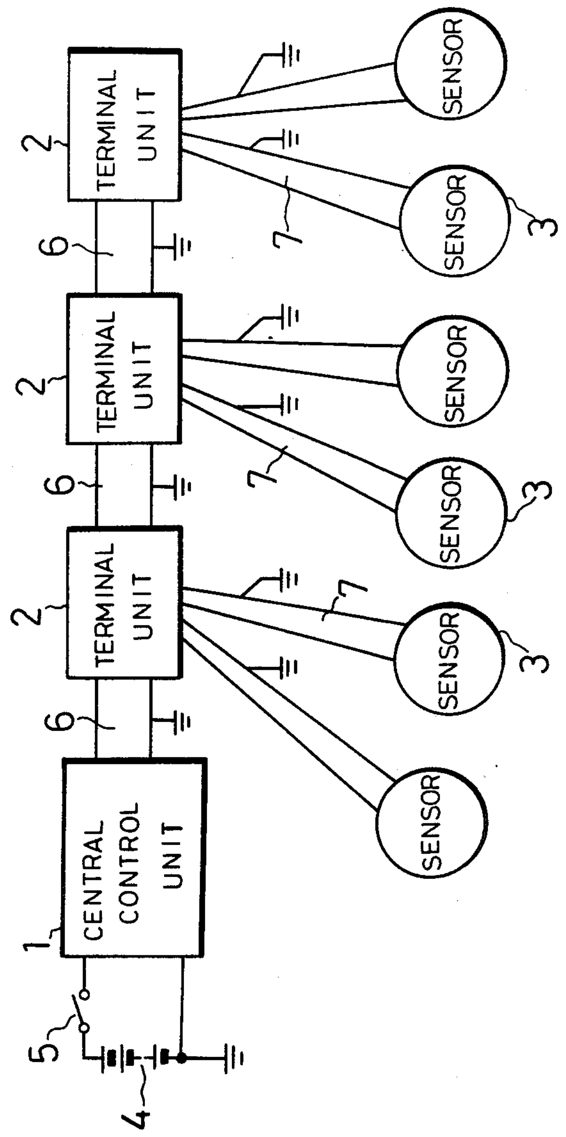
FIG. 1 is a block diagram of an electric wiring system according to the present invention.

FIG. 1 shows the overall arrangement of an electric wiring system according to the present invention.

The electric wiring system includes a central control unit 1, a plurality (three in the illustrated embodiment) of terminal units 2, and a plurality (six in the illustrated embodiment) of sensors 3. Electric power is supplied via a key switch 5 from a battery 4 to the central control unit 1. The central control unit 1 and the terminal units 2 are interconnected by a main wiring harness 6 composed of a pair of common power supply and signal lines. Two of the sensors 3 are connected to each of the terminal units 2 by a subwiring harness 7 serving as signal input lines.

Signals from the sensors 3 are delivered through the corresponding terminal units 2 to the central control unit via the main wiring harness 6.

Figure 2:
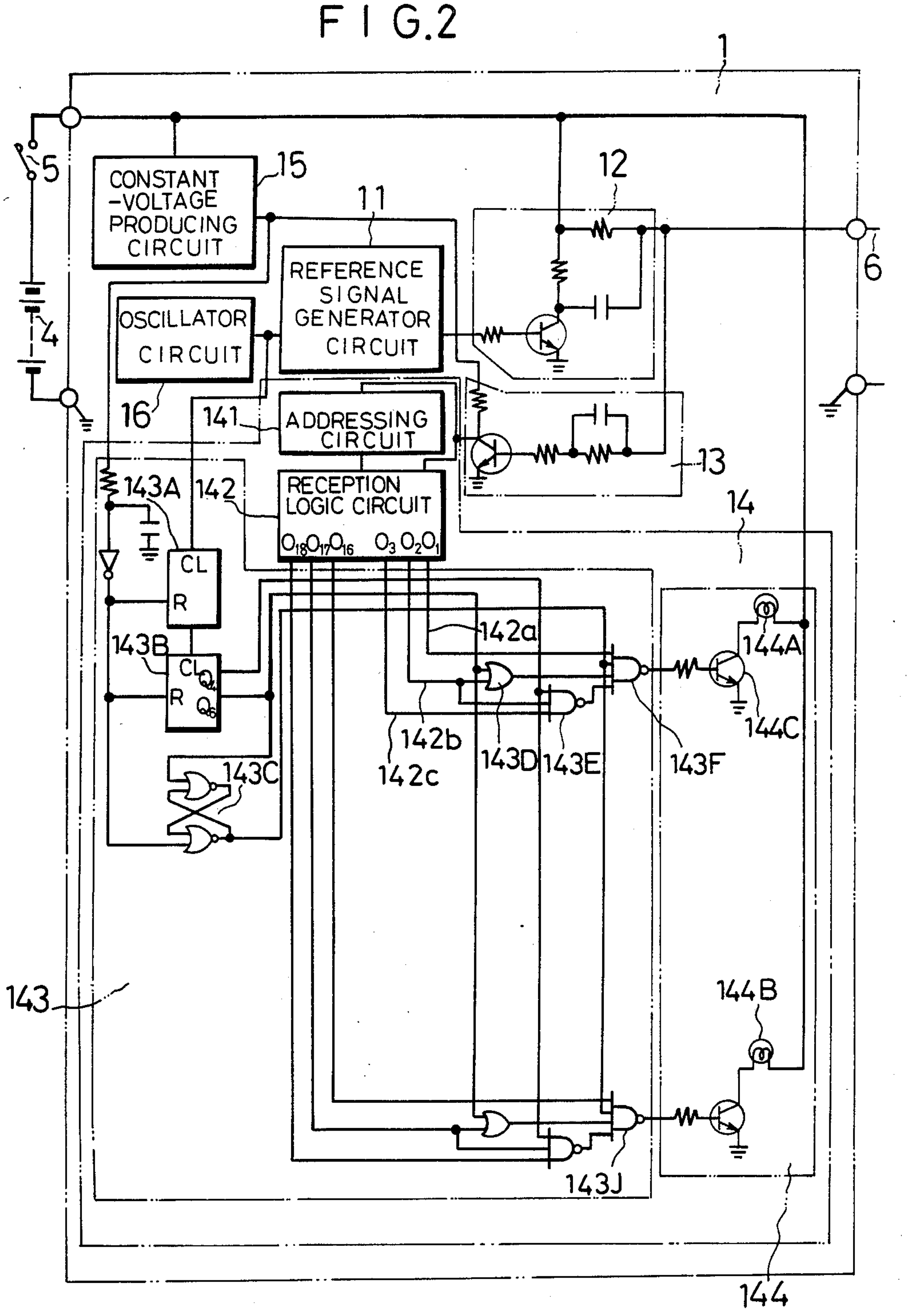
FIG. 2 is a circuit diagram of a central control unit.

FIG. 2 shows a circuit arrangement of the central control unit 1. The central control unit 1 is composed of a reference signal generator circuit 11, a modulator circuit (hereinafter referred to a "first modulator circuit") 12, a demodulator circuit (hereinafter referred to as a "first demodulator circuit") 13, a control circuit 14, a constant-voltage producing circuit 15, and an oscillator circuit 16.

The control circuit 14 comprises an addressing circuit 141, a reception logic circuit 142, an indicator flashing circuit 143, and an indicator circuit 144.

Figure 3:
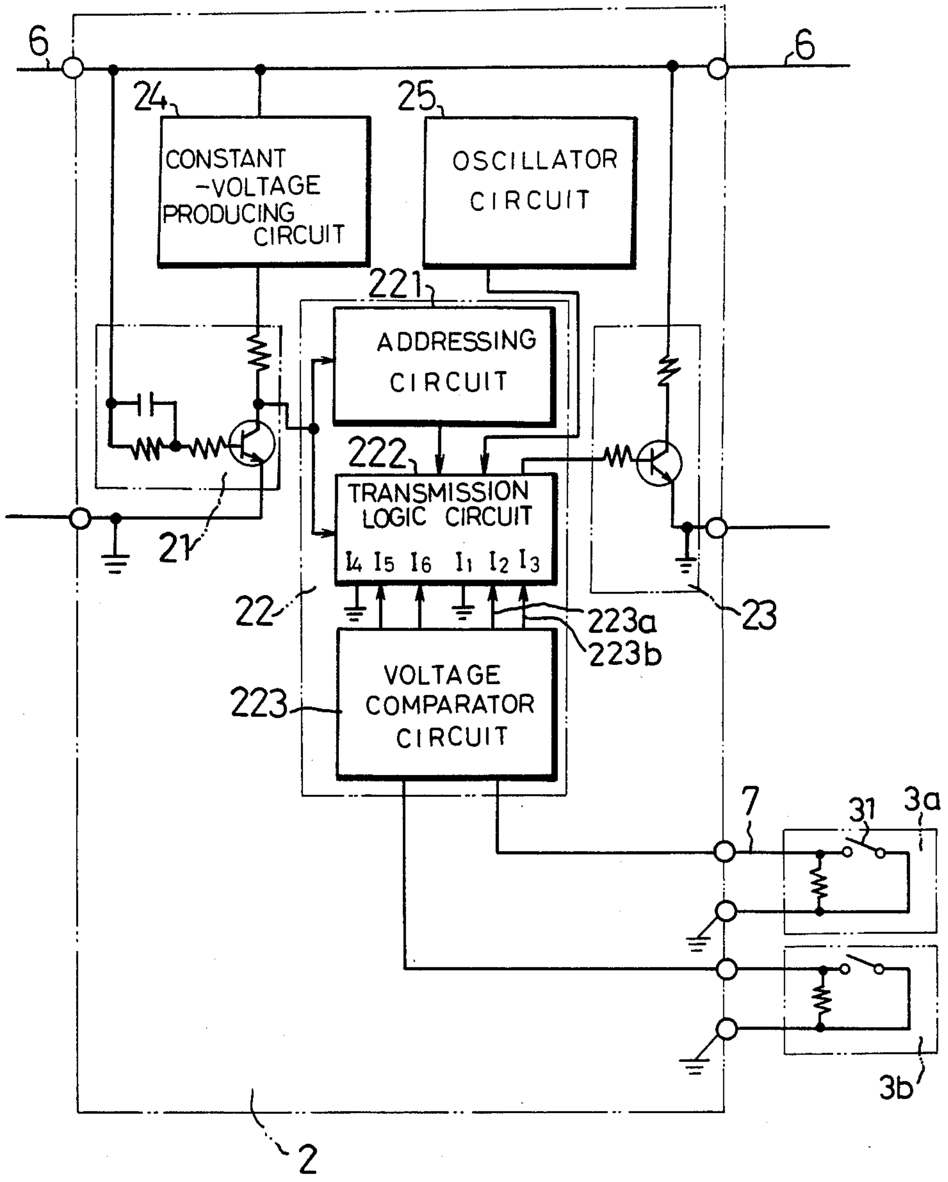
FIG. 3 is a circuit diagram of a terminal unit.

FIG. 3 illustrates a circuit arrangement of each of the terminal units 2. The terminal unit 2 comprises a demodulator circuit (hereinafter referred to a "second demodulator circuit") 21, a composite signal generator circuit 22, a modulator circuit (hereinafter referred to as a "second modulator circuit") 23, a constant-voltage producing circuit 24, and an oscillator circuit 25.

The composite signal generator circuit 22 includes an addressing circuit 221, a transmission logic circuit 222, and a voltage comparator circuit 223.

Operation of the electric wiring system thus constructed will hereinafter be described.

Figure 4:
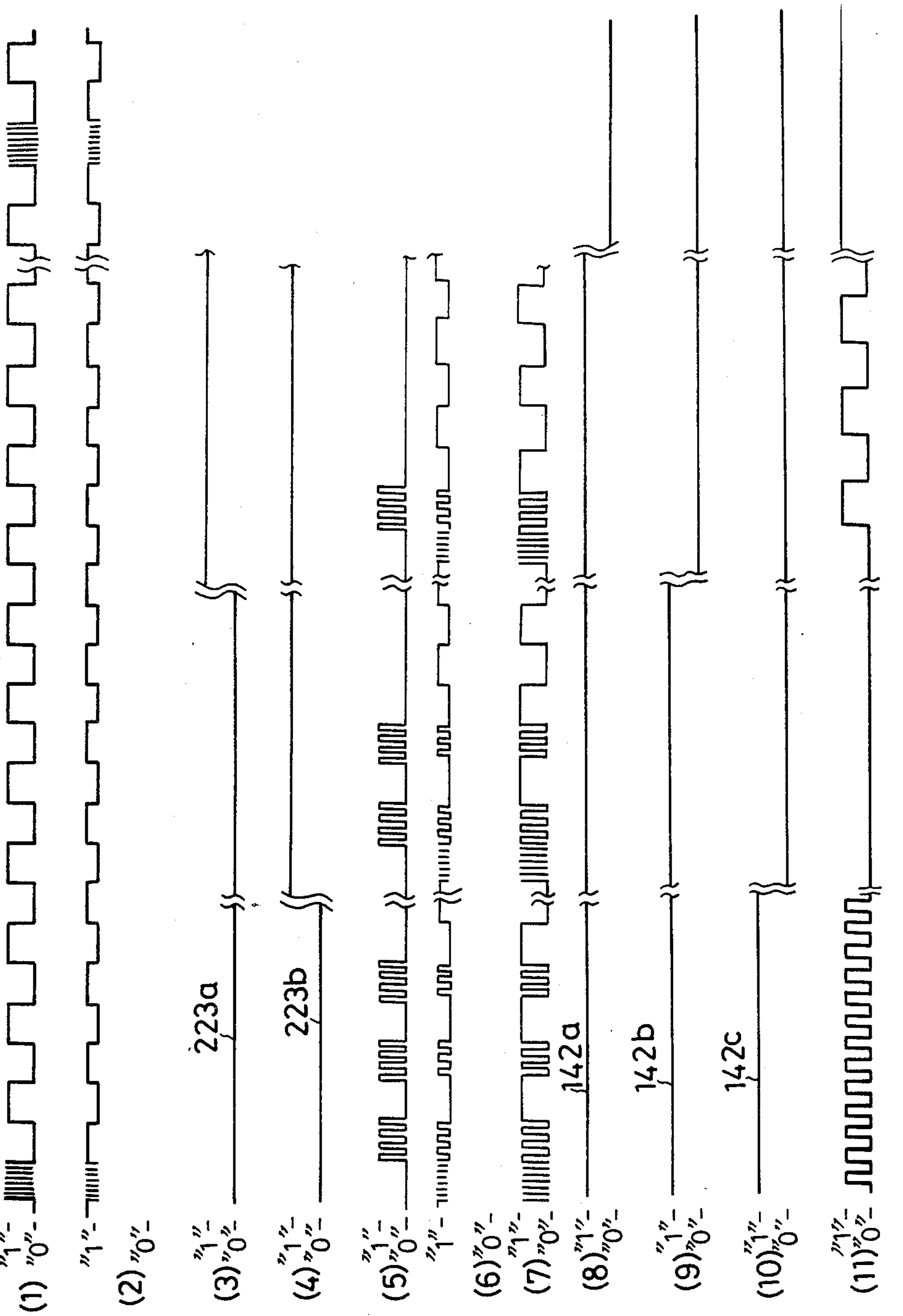
FIG. 4 is a diagram showing the waveforms of various signals.

The reference signal generator circuit 11 frequency-divides clock pulses delivered from the oscillator circuit 16 to produce a reference signal composed of reference pulses and a successive train of pulses as shown at (1) in FIG. 4. The reference pulses are composed of high-frequency pulses generated successively for a fixed period of time, and will be produced periodically. The successive pulse train has 18 pulses, three of which are applied to each sensor 3.

The reference signal is fed to the first modulator circuit 12 (FIG. 2) composed of a transistor, resistors, and a capacitor, by which the reference signal is added to a power supply voltage on the main wiring harness 6, as shown at (2) in FIG. 4. The level "1" shown at (2) in FIG. 4 indicates the D.C. level of the power supply voltage.

The reference signal delivered through the wiring harness 6 to each of the terminal units 2 is demodulated into the waveform as shown in FIG. 4 (1) by the second demodulator circuit 21 (FIG. 3) composed of a transistor, resistors, and a capacitor. The demodulated reference signal is then applied to the addressing circuit 221 in the composite signal generator circuit 22.

The address circuit 221 contains within it addresses of all of the sensors coupled to each terminal unit 2. In the illustrated embodiment, three addresses are assigned to each of the sensors. For example, first through third addresses are assigned to a sensor *3a* shown in FIG. 3. The addressing circuit 221 counts the train of pulses following the reference pulses in the reference signal and successively issues address signals indicative of the first through third addresses to the transmission logic circuit 222 each time each of the first through third pulses of the reference signal are applied.

The transmission logic circuit 222 has input terminals $I_1$, $I_2$, $I_3$ corresponding to the address signals of the first through third addresses. The input terminal $I_1$ is grounded, and the input terminals $I_2$, $I_3$ are supplied with output signals *223a, 223b,* respectively, from the voltage comparator 223. The signals *223a, 223b* assume a level "0" (at the lefthand end in FIGS. 4 (3) and (4)) when an output contact 31 of the sensor *3a* is closed to produce an abnormal signal of level "0" on the subwiring harness 7. When the output contact 31 of the sensor *3a* is opened to produce a normal signal of level "1" on the subwiring harness 7, the signals *223a, 223b* have levels "0" and "1", respectively, (at the central portion in FIGS. 4 (3) and (4)). If the subwiring harness 7 is broken off, both the signals *223a, 223b* assume a level "1" (at the righthand end in FIGS. 4 (3) and (4)).

The transmission logic circuit 222 is responsive to the address signals from the addressing circuit 221 for successively picking up input signals from the terminals $I_1$ through $I_3$. When the input signals are of level "0", the transmission logic circuit 222 generates a composite signal (shown in FIG. 4 (5)) by adding high-frequency pulses at pulse positions corresponding to the first through third pulses of the reference signal fed from the second demodulator circuit 21. Since the input terminal $I_1$ is of level "0" at all times, high-frequency pulses are always added at the pulse position corresponding to the first pulse.

The logic circuit 222 also has input terminals $I_4$, $I_5$, $I_6$ assigned to another sensor *3b* and corresponding respectively to address signals representative of fourth through sixth addresses.

The composite signal in which high-frequency pulses are added at pulse positions of the first through sixth pulses based on the signals from the sensors *3a, 3b* is then delivered to the second modulator circuit 23, by which the composite signal is added to the power supply voltage on the main wiring harness 26 as shown in FIG. 4 (6).

To the power supply voltage, there are also added composite signals generated by the other terminal units 2 (as shown in FIG. 1). In the illustrated embodiment, a final composite signal in which high-frequency pulses are added at pulse positions of the first through eighteenth pulses corresponding to the six sensors reaches the first demodulator circuit 13 in the central control unit 1 shown in FIG. 2.

The composite signal is then demodulated by the first demodulator circuit 13 into the waveform shown in FIG. 4 (7), and the demodulator signal is applied to the addressing circuit 141 in the control circuit 14. The addressing circuit 141 counts the pulse train in the composite signal and successively issues address signals of the first through eighteenth addresses to the reception logic circuit 142 each time each of the first through eighteenth pulses is applied. The reception logic circuit 142 has output terminals $O_1$ through $O_{18}$ (only the terminals $O_1$, $O_2$, $O_3$, $O_{16}$, $O_{17}$, $O_{18}$ shown).

The logic circuit 142 determines whether high-frequency pulses are added to the pulses corresponding to the address signals of the composite signal. If high-frequency pulses are added, then the logic circuit 142 generates output signals of level "1" through the terminals $O_1$ through $O_{18}$. FIG. 4 shows at (8), (9), (10) output signals *142a, 142b, 142c* generated from terminals $O_1$ through $O_3$ based on the composite signal shown in FIG. 4 (7).

When the main wiring harness 6 is broken off, any composite signal from the terminal unit or units 2 connected to the broken part of wiring harness 6 does not appear on the power supply voltage, and the reference signal generated by the first modulator circuit 12 is applied to the reception logic circuit 142 through the first demodulator circuit 13. For example, when the main wiring harness 6 is broken off between the terminal unit 2 to which the sensor *3a* is coupled and the central control circuit 1, the logic circuit 142 is supplied with the reference signal with no high-frequency pulses added to the first through third pulses. At that time, as shown at the righthand end in FIGS. 4 (8), (9), (10), all of the output signals *142a* through *142c* of the logic circuit 142 have level "0".

The indicator flashing circuit 143 shown in FIG. 2 has counters 143A, 143B and a flip-flop 143C which are all reset when the key switch 5 is turned on. NAND gates 143F, 143J then produce outputs of level "1" to energize indicator lamps 144A, 144B in the indicator circuit 144 for lamp checking. Although only the two gates 143F, 143J and the two indicator lamps 144A, 144B are illustrated, six gates and six indicator lamps are actually provided for the respective sensors. The flip-flop 143C is reset upon elapse of a fixed period of time by a pulse output generated from a terminal $Q_6$ of the counter 143B by frequency-dividing the clock pulses from the oscillator circuit 16.

The counter 143B also produces through its terminal $Q_4$ pulses having a frequency higher than that of the pulses from the terminal $Q_6$.

When the sensor *3a* generates an abnormal signal, the signals *142a* through *142c* all have level "1" as shown at the lefthand end in FIGS. 4 (8), (9), (10). The NAND gates 143E, 143F are thereby enabled to allow the pulse signal (at the lefthand end in FIG. 4 (11)) from the terminal $Q_4$ of the counter 143B to be applied to a transistor 144C in the indicator circuit 144, thus causing the indicator lamp 144A to flash.

When the sensor *3a* generates a normal signal, the signals *142a, 142b* are of level "1" and the signal *142c* is of level "0" as shown at the lefthand side of a central portion in FIGS. 4 (8), (9), (10). The gate 143E is thereby disabled, and the output from the gate 143F has level "0", whereupon the indicator lamp 144A is deenergized.

When the subwiring harness 7 leading to the sensor *3a* is broken off, the signals *142b, 142c* become level "0" as shown at the righthand side of the central portion in FIGS. 4 (8), (9), (10). An OR gate 143D is therefor enabled to permit the output pulses (as shown at the righthand side of a central portion in FIG. 4 (11)) from the terminal $Q_6$ of the counter 143B to be applied to the transistor 144C. The indicator lamp 144A then flashes at a period longer than it does when the sensor *3a* produces an abnormal signal.

When the main wiring harness 6 is broken off, all of the signals 142*a* through 142*c* have level "0" as shown at the righthand end in FIGS. 4 (8), (9), (10), and the gate 143F is closed to produce an output of level "1" (shown at the righthand end in FIG. 4 (11)), thus making the indicator lamp 144A flash.

The other indicator lamps are controlled for similar indications dependent on the conditions of the corresponding sensors and the wiring harnesses 6, 7.

While in the foregoing embodiment the central control unit 1 operates the indicator lamps, it may also be arranged to operate actuators or other devices. Although three pulses are assigned to each sensor, two pulses may be assigned to each sensor if it is desired to detect breakage of either the main wiring harness or the subwiring harness. If line breakage is not necessary to be detected, then only one pulse need be allotted to each sensor.

As described above, an electric wiring system according to the present invention is composed of a central control unit and terminal units connected thereto by common power supply lines for transmitting information from a plurality of sensors coupled to the terminal units as serial pulses over the power supply lines. This arrangment greatly reduces the number of wires required between the sensors and the control units.

Since the central control unit has an indicator flashing circuit for flashing indicator lamps at different periods dependent on various signals from the sensors, the sensor signals can be indicated on the same indicator lamps, with the result that an indicator panel required may be of a reduced size.

With the capability of detecting breakage of the wiring harnesses, the overall wiring system is of high reliability and has an ability to restore its normal condition, should any malfunction occur.

In the foregoing embodiment, the functions of the central control unit and the terminal unit are performed by a hard wired logic. The above functions can be also performed by a computer program.

Although a certain preferred embodiment has been shown and described, it should be understood that many changes and modifications may be made therein without departing from the scope of the appended claims.

What is claimed is:

1. An electric wiring system comprising:

at least one terminal unit;

a plurality of sensors connected to each said terminal unit, each sensor connected to a terminal unit by a signal input line;

a central control unit coupled to said at least one terminal unit for receiving signals from said sensors therethrough;

power supply line means for coupling said central control unit to said at least one terminal unit and for carrying power to said at least one terminal;

said central control unit comprising:

(1) reference signal generator circuit means for repetitively generating a reference signal composed of a train for predetermined number of pulses, each of said pulses being assigned to one of said sensors;

(2) modulator circuit means for applying said reference signal to said power supply line means;

(3) demodulator circuit means, coupled to said power supply line means, for receiving a composite signal including high-frequency pulses generated by one of said terminal units;

(4) control circuit means, coupled to said demodulator circuit means, for determining output conditions of said sensors based on the presence and absence of said high-frequency pulses in said composite signal; and (5) an output device operable by said control circuit dependent on the determined output conditions of said sensors; and each said terminal unit comprising:

(1) a demodulator circuit means for picking up said reference signal from said power supply line means;

(2) composite signal generator circuit means for selectively generating a composite signal by adding high-frequency pulses at pulse positions corresponding to the pulses of said reference signal assigned to said sensors, dependent on the output conditions of said sensors; and (3) modulator circuit means for applying said composite signal to said power supply lines.

2. An electric wiring system according to claim 1, wherein said reference signal generator circuit means generates a reference signal composed of a train of pulses, one of said pulses being assigned to each of said sensors.

3. An electric wiring system according to claim 1, wherein said reference signal generator circuit means generates a reference signal composed of a train of pulses, a plurality of successive ones of which are assigned to each of said sensors.

4. An electric wiring system according to claim 3, wherein said composite signal generator circuit means generates a composite signal in which high-frequency pulses are added to at least all times at one of said pulse positions.

5. An electric wiring system according to claim 4, wherein said control circuit means is arranged to operate said output device by determining breakage of said power supply lines based on the presence and absence of said high-frequency pulses at said at least one of said pulse positions in said composite signal.

6. An electric wiring system according to claim 3, wherein said reference signal generator circuit means generates a reference signal composed of a train of pulses, two successive pulses of which being assigned to each of said sensors.

7. An electric wiring system according to claim 6, wherein said composite signal generator circuit means further comprises means for: (1) adding high-frequency pulses at one of said pulse positions when said sensors produce a normal signal, (2) adding high-frequency pulses at another of said pulse positions when said sensors produce an abnormal signal, and (3) generating a composite signal in which no high-frequency pulses are added at any of said pulse positions when said signal input line is broken.

8. An electric wiring system according to claim 3, wherein said reference signal generator circuit means generates a reference signal composed of a train of pulses, successive three of which are assigned to each of said sensors.

9. An electric wiring system according to claim 8, wherein said composite signal generator circuit means further comprises means for: (1) adding high-frequency pulses at all times at one of said pulse positions, (2) adding high-frequency pulses at one of two remaining pulse positions when said sensors produce a normal signal, (3) adding high-frequency pulses at both of said two remaining pulse positions when said sensors produce an abnormal signal, and (4) generating a composite signal in which no high-frequency pulses are added at any of said two remaining pulse positions when said signal input line is broken.

10. An electric wiring system according to claim 1, wherein said output device comprises as many monitor indicators as there are said sensors.

11. An electric wiring system according to claim 10, wherein said control circuit is arranged to energize, de-energize, or flashes said monitor indicators at different frequencies dependent on the presence and absence of the high-frequency pulses at said pulse positions in said composite signal.

12. An electric wiring system comprising:

a terminal unit;

a plurality of sensors connected to said terminal unit by a signal input line;

central control unit means, connected to said terminal unit for receiving signals from said sensors therethrough;

power supply means for connecting said terminal to said control unit means and for carrying power thereinbetween;

said central control unit means further comprising means for;

(1) generating a reference signal composed of a train of pulses, a predetermined number of said pulses being assigned to each of said sensors, (2) applying said reference signal to said power supply lines, (3) receiving a composite signal generated by said terminal unit from said power supply line, and (4) determining output conditions of said sensors based on the presence and absence of high-frequency pulses in said composite signal; and said terminal unit further comprising means for:

(1) picking up said reference signal from said power supply lines, (2) generating a composite signal by adding said high-frequency pulses at pulse positions corresponding to said pulses of said reference signal assigned to said sensors, depending on said output conditions of said sensors, and (3) applying said composite signal to said power supply lines.

13. A method of modulating an alarm signal in an apparatus containing a plurality of addressed sensors, comprising the steps of:

generating a periodic reference signal having a predetermined number of pulses, said predetermined number being at least two times the number of said sensors being monitored;

allocating at least two consecutive pulses of said reference signal for each of said sensors;

generating a high-frequency component;

adding said high-frequency component to at least one, but not all, of said consecutive pulses of said reference signal for a particular sensor, when said particular sensor is not alarmed;

adding said high-frequency component to at least one other of said consecutive pulses of said reference signal for a particular sensor when said particular sensor is alarmed; and adding no high-frequency components when a fault in said apparatus occurs.

* * * * *